April 30, 1929.  E. W. NORTH  1,710,710
PULLEY AND PROCESS OF MAKING THE SAME
Filed Nov. 19, 1926
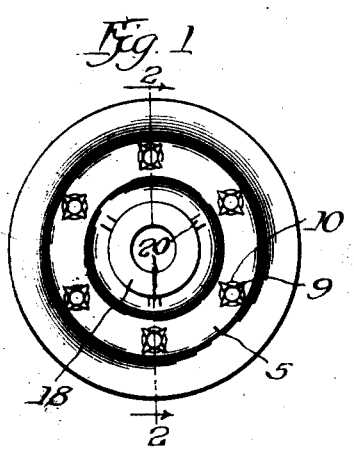
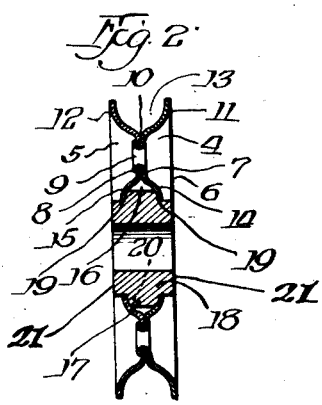
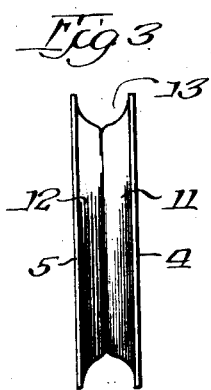
Inventor:
Edwin W. North
By Ira J. Wilson
Atty.

Patented Apr. 30, 1929.

1,710,710

UNITED STATES PATENT OFFICE.

EDWIN W. NORTH, OF ROCKFORD, ILLINOIS, ASSIGNOR TO NATIONAL LOCK CO., OF ROCKFORD, ILLINOIS, A CORPORATION OF DELAWARE.

PULLEY AND PROCESS OF MAKING THE SAME.

Application filed November 19, 1926. Serial No. 149,317.

This invention relates to pulleys and aims to provide a pulley which is efficient and durable in operation and which may be manufactured with a maximum of economy. Pulleys, such as have been used heretofore, particularly in connection with the raising and lowering of windows, have been constructed both with and without ball bearings. Those pulleys which have been constructed without ball bearings have usually been troublesome and noisy due to their tendency to stick after being in service a considerable length of time without operation. Pulleys of the above type which have been constructed with ball bearings frequently give trouble on account of the inferior quality of the bearing, it being essential that such pulleys be manufactured as cheaply as possible in order to be marketable.

It is accordingly an object of this invention to provide a pulley and process for making the same which overcomes the above difficulties.

It is also an object of this invention to provide a pulley which has an anti-frictional non-metallic bearing, such as wood.

It is further an object of this invention to provide an efficient pulley of the above type which is constructed of sheet metal.

It is another object of this invention to provide a sheet metal pulley having a non-metallic bushing, such as wood.

Other and further objects of this invention will be apparent from the specification and claims when examined in connection with the accompanying drawings illustrating a preferred embodiment of this invention, and wherein Fig. 1 is a side elevation of a pulley, Fig. 2 is a section taken at the line 2—2 of Fig. 1, and Fig. 3 is an end elevation of a pulley.

Referring to the drawings more particularly, the pulley 6 is formed by stamping two sheet metal similar complemental parts 4 and 5 respectively, and securing said parts together, clamping the bearing therebetween. The parts 4 and 5 each have annular web portions 7 and 8 respectively, and are riveted together by striking a plurality of spaced tangs 9 integral with the portion 7 through corresponding apertures 10 in the portion 8 with the ends of said tangs overlapping the outer edges of said apertures.

The parts 4 and 5 are, previous to their being riveted together, stamped to provide oppositely curved circular marginal portions 11 and 12 respectively, which cooperate to form a peripheral groove 13 on the pulley 6 in which groove a cord may be carried.

The pulley 6 is provided with a central opening consisting of similar apertures 19 in each of the parts 4 and 5. The inner periphery of the portions 4 and 5 are also stamped to provide oppositely curved circular marginal portions 14 and 15 respectively which cooperate to form an inner peripheral groove 16 adapted to receive a retaining ring or shoulder 17 integral with a cylindrically shaped wooden bearing 18, said parts being riveted together on opposite sides of said ring. The wood bearing 18 previous to its incorporation in the pulley may be soaked in or otherwise treated with a suitable lubricant so that it will permanently supply the necessary lubrication. The bearing 18 is firmly supported in the pulley 6 with its ends projecting outwardly of the apertures 19, the shoulder 17 being formed intermediate said ends on the outer periphery of said bearing. The ends of the bearing 18 present opposite bearing surfaces 21 for taking up lateral thrust on the pulley within the casing (not shown) for centering the pulley in the casing.

In order to prevent relative rotation between the bearing 18 and the pulley 6 the marginal portions 14 and 15 are provided with a plurality of inwardly struck tangs 20 which enter the shoulder 17.

It will be apparent to those skilled in the art that the pulley including the bearing 18 will stand up through long continued use and even when the operation of the pulley is not continuous it will not be apt to stick.

It will be noted further that the aforedescribed pulley may be very economically manufactured.

I am aware that many changes may be made throughout a wide range without departing from the principles of this invention and I do not wish to be limited to the details shown and described.

I claim:

1. A sheet metal pulley comprising a metallic body portion and a fibrous hub, said hub and body having inter-engaging portions to prevent relative axial movement thereof and a tang struck from said body and depressed into said fibrous hub for preventing relative rotation between said hub and body.

2. A sheet metal pulley comprising a body formed of two complemental parts centrally apertured to provide a central opening and a circumferential groove, a fibrous bushing disposed within said opening and having an annular shoulder on the periphery thereof seated in said groove, whereby to prevent relative axial movement of said body and bushing and a tang struck from said body and engaging in said shoulder for preventing relative rotation of said body and bushing.

3. A sheet metal pulley comprising a body consisting of a plurality of complemental circular disks, the central portions of which are laterally offset and centrally apertured to provide a central hub receiving opening and an intermediate circumferential groove, a fibrous hub disposed within said opening and having an annular shoulder on the periphery thereof seated in said groove, whereby to prevent relative axial movement of said body and hub and a plurality of tangs struck from the central portion of one of said disks and depressed into said annular shoulder of said fibrous hub for preventing relative rotation between the hub and the body.

In witness of the foregoing I affix my signature.

EDWIN W. NORTH.